United States Patent
Raichelgauz et al.

(10) Patent No.: US 9,558,449 B2
(45) Date of Patent: Jan. 31, 2017

(54) SYSTEM AND METHOD FOR IDENTIFYING A TARGET AREA IN A MULTIMEDIA CONTENT ELEMENT

(71) Applicant: Cortica, Ltd., Ramat Gan (IL)

(72) Inventors: Igal Raichelgauz, New York, NY (US); Karina Odinaev, New York, NY (US); Yehoshua Y. Zeevi, Haifa (IL)

(73) Assignee: Cortica, Ltd., Tel Aviv (IL)

( * ) Notice: Subject to any disclaimer, the term of this patent is extended or adjusted under 35 U.S.C. 154(b) by 0 days.

(21) Appl. No.: 14/530,913

(22) Filed: Nov. 3, 2014

(65) Prior Publication Data
US 2015/0052086 A1 Feb. 19, 2015

Related U.S. Application Data

(63) Continuation-in-part of application No. 13/770,603, filed on Feb. 19, 2013, which is a continuation-in-part
(Continued)

(30) Foreign Application Priority Data

| Oct. 26, 2005 | (IL) | 171577 |
| Jan. 29, 2006 | (IL) | 173409 |
| Aug. 21, 2007 | (IL) | 185414 |

(51) Int. Cl.
*G06N 5/00* (2006.01)
*G06F 1/00* (2006.01)
(Continued)

(52) U.S. Cl.
CPC .......... *G06N 5/04* (2013.01); *G06F 17/30017* (2013.01); *G06F 17/30899* (2013.01);
(Continued)

(58) Field of Classification Search
CPC ............ G06N 5/02; G06N 5/04; G06N 5/022; G06Q 50/01
(Continued)

(56) References Cited

U.S. PATENT DOCUMENTS

| 4,972,363 A | 11/1990 | Nguyen et al. |
| 5,307,451 A | 4/1994 | Clark |

(Continued)

FOREIGN PATENT DOCUMENTS

| WO | 0231764 | 4/2002 |
| WO | 2007049282 | 5/2007 |

OTHER PUBLICATIONS

Boari et al, "Adaptive Routing for Dynamic Applications in Massively Parallel Architectures", 1995 IEEE, Spring 1995.
(Continued)

*Primary Examiner* — Stanley K Hill
*Assistant Examiner* — Kalpana Bharadwaj
(74) *Attorney, Agent, or Firm* — M&B IP Analysts, LLC (57) ABSTRACT

A system and method for detecting a target area of user interest within a multimedia content element are provided. The method includes receiving the multimedia content element from a user computing device; partitioning the multimedia content element into a number of partitions, each partition having at least one object therein; generating at least one signature for each partition of the multimedia content element, wherein each of the at least one signatures for each partition represents a concept; determining a context of the multimedia content element based on the concepts; and identifying at least one partition of the multimedia content as a target area of user interest based on the context of the multimedia content element.

20 Claims, 7 Drawing Sheets

Related U.S. Application Data of application No. 13/624,397, filed on Sep. 21, 2012, now Pat. No. 9,191,626, which is a continuation-in-part of application No. 13/344,400, filed on Jan. 5, 2012, now Pat. No. 8,959,037, which is a continuation-in-part of application No. 12/434,221, filed on May 1, 2009, now Pat. No. 8,112,376, said application No. 13/624,397 is a continuation-in-part of application No. 12/195,863, filed on Aug. 21, 2008, now Pat. No. 8,326,775, and a continuation-in-part of application No. 12/084,150, filed as application No. PCT/IL2006/001235 on Oct. 26, 2006, now Pat. No. 8,655,801, said application No. 12/195,863 is a continuation-in-part of application No. 12/084,150, filed on Apr. 7, 2008, now Pat. No. 8,655,801.

(60) Provisional application No. 61/899,225, filed on Nov. 3, 2013.

(51) Int. Cl.

| | | |
|---|---|---|
| *G06N 5/04* | (2006.01) | |
| *G06N 7/00* | (2006.01) | |
| *G06F 17/30* | (2006.01) | |
| *G06Q 30/02* | (2012.01) | |
| *H04H 60/37* | (2008.01) | |
| *H04H 60/56* | (2008.01) | |
| *H04N 7/173* | (2011.01) | |
| *H04N 21/258* | (2011.01) | |
| *H04N 21/2668* | (2011.01) | |
| *H04N 21/466* | (2011.01) | |
| *H04N 21/81* | (2011.01) | |
| *H04H 60/46* | (2008.01) | |

(52) U.S. Cl.
CPC .......... *G06N 7/005* (2013.01); *G06Q 30/0251* (2013.01); *H04H 60/37* (2013.01); *H04H 60/46* (2013.01); *H04H 60/56* (2013.01); *H04N 7/17318* (2013.01); *H04N 21/25891* (2013.01); *H04N 21/2668* (2013.01); *H04N 21/466* (2013.01); *H04N 21/8106* (2013.01); *H04H 2201/90* (2013.01)

(58) Field of Classification Search
USPC .......................................... 707/603; 386/248
See application file for complete search history.

(56) References Cited

U.S. PATENT DOCUMENTS

| | | |
|---|---|---|
| 5,568,181 A | 10/1996 | Greenwood et al. |
| 5,806,061 A | 9/1998 | Chaudhuri et al. |
| 5,852,435 A | 12/1998 | Vigneaux et al. |
| 5,870,754 A | 2/1999 | Dimitrova et al. |
| 5,887,193 A | 3/1999 | Takahashi et al. |
| 5,940,821 A | 8/1999 | Wical |
| 5,978,754 A | 11/1999 | Kumano |
| 5,987,454 A | 11/1999 | Hobbs |
| 6,038,560 A | 3/2000 | Wical |
| 6,052,481 A | 4/2000 | Grajski et al. |
| 6,076,088 A | 6/2000 | Paik et al. |
| 6,122,628 A | 9/2000 | Castelli et al. |
| 6,128,651 A | 10/2000 | Cezar |
| 6,144,767 A | 11/2000 | Bottou et al. |
| 6,147,636 A | 11/2000 | Gershenson |
| 6,240,423 B1 | 5/2001 | Hirata |
| 6,243,375 B1 | 6/2001 | Speicher |
| 6,363,373 B1 | 3/2002 | Steinkraus |
| 6,381,656 B1 | 4/2002 | Shankman |
| 6,411,229 B2 | 6/2002 | Kobayashi |
| 6,422,617 B1 | 7/2002 | Fukumoto et al. |
| 6,493,692 B1 | 12/2002 | Kobayashi et al. |
| 6,493,705 B1 | 12/2002 | Kobayashi et al. |
| 6,523,022 B1 | 2/2003 | Hobbs |
| 6,523,046 B2 | 2/2003 | Liu et al. |
| 6,524,861 B1 | 2/2003 | Anderson |
| 6,526,400 B1 | 2/2003 | Takata et al. |
| 6,560,597 B1 | 5/2003 | Dhillon et al. |
| 6,594,699 B1 | 7/2003 | Sahai et al. |
| 6,601,060 B1 | 7/2003 | Tomaru |
| 6,611,628 B1 | 8/2003 | Sekiguchi et al. |
| 6,611,837 B2 | 8/2003 | Schreiber |
| 6,618,711 B1 | 9/2003 | Ananth |
| 6,643,620 B1 | 11/2003 | Contolini et al. |
| 6,643,643 B1 | 11/2003 | Lee et al. |
| 6,665,657 B1 | 12/2003 | Dibachi |
| 6,675,159 B1 | 1/2004 | Lin et al. |
| 6,728,706 B2 | 4/2004 | Aggarwal et al. |
| 6,751,363 B1 | 6/2004 | Natsev et al. |
| 6,751,613 B1 | 6/2004 | Lee et al. |
| 6,754,435 B2 | 6/2004 | Kim |
| 6,763,519 B1 | 7/2004 | McColl et al. |
| 6,774,917 B1 | 8/2004 | Foote et al. |
| 6,804,356 B1 | 10/2004 | Krishnamachari |
| 6,819,797 B1 | 11/2004 | Smith et al. |
| 6,836,776 B2 | 12/2004 | Schreiber |
| 6,845,374 B1 | 1/2005 | Oliver et al. |
| 6,901,207 B1 | 5/2005 | Watkins |
| 6,970,881 B1 | 11/2005 | Mohan et al. |
| 6,978,264 B2 | 12/2005 | Chandrasekar et al. |
| 7,006,689 B2 | 2/2006 | Kasutani |
| 7,013,051 B2 | 3/2006 | Sekiguchi et al. |
| 7,020,654 B1 | 3/2006 | Najmi |
| 7,043,473 B1 | 5/2006 | Rassool et al. |
| 7,047,033 B2 | 5/2006 | Wyler |
| 7,124,149 B2 | 10/2006 | Smith et al. |
| 7,199,798 B1 | 4/2007 | Echigo et al. |
| 7,260,564 B1 | 8/2007 | Lynn et al. |
| 7,277,928 B2 | 10/2007 | Lennon |
| 7,296,012 B2 | 11/2007 | Ohashi |
| 7,302,117 B2 | 11/2007 | Sekiguchi et al. |
| 7,313,805 B1 | 12/2007 | Rosin et al. |
| 7,340,458 B2 | 3/2008 | Vaithilingam et al. |
| 7,346,629 B2 | 3/2008 | Kapur et al. |
| 7,353,224 B2 | 4/2008 | Chen et al. |
| 7,376,672 B2 | 5/2008 | Weare |
| 7,376,722 B1 | 5/2008 | Sim et al. |
| 7,392,238 B1 | 6/2008 | Zhou et al. |
| 7,406,459 B2 | 7/2008 | Chen et al. |
| 7,433,895 B2 | 10/2008 | Li et al. |
| 7,450,740 B2 | 11/2008 | Shah et al. |
| 7,464,086 B2 | 12/2008 | Black et al. |
| 7,519,238 B2 | 4/2009 | Robertson et al. |
| 7,523,102 B2 | 4/2009 | Bjarnestam et al. |
| 7,526,607 B1 | 4/2009 | Singh et al. |
| 7,536,384 B2 | 5/2009 | Venkataraman et al. |
| 7,536,417 B2 | 5/2009 | Walsh et al. |
| 7,542,969 B1 | 6/2009 | Rappaport et al. |
| 7,548,910 B1 | 6/2009 | Chu et al. |
| 7,555,477 B2 | 6/2009 | Bayley et al. |
| 7,555,478 B2 | 6/2009 | Bayley et al. |
| 7,562,076 B2 | 7/2009 | Kapur |
| 7,574,436 B2 | 8/2009 | Kapur et al. |
| 7,574,668 B2 | 8/2009 | Nunez et al. |
| 7,577,656 B2 | 8/2009 | Kawai et al. |
| 7,660,737 B1 | 2/2010 | Lim et al. |
| 7,689,544 B2 | 3/2010 | Koenig |
| 7,694,318 B2 | 4/2010 | Eldering |
| 7,697,791 B1 | 4/2010 | Chan et al. |
| 7,769,221 B1 | 8/2010 | Shakes et al. |
| 7,788,132 B2 | 8/2010 | Desikan et al. |
| 7,788,247 B2 | 8/2010 | Wang et al. |
| 7,836,054 B2 | 11/2010 | Kawai et al. |
| 7,860,895 B1 | 12/2010 | Scofield et al. |
| 7,904,503 B2 | 3/2011 | Van De Sluis |
| 7,920,894 B2 | 4/2011 | Wyler |
| 7,921,107 B2 | 4/2011 | Chang et al. |
| 7,974,994 B2 | 7/2011 | Li et al. |
| 7,987,194 B1 | 7/2011 | Walker et al. |
| 7,987,217 B2 | 7/2011 | Long et al. |
| 7,991,715 B2 | 8/2011 | Schiff et al. |

(56) References Cited

U.S. PATENT DOCUMENTS

| | | |
|---|---|---|
| 8,000,655 B2 | 8/2011 | Wang et al. |
| 8,036,893 B2 | 10/2011 | Reich |
| 8,098,934 B2 | 1/2012 | Vincent et al. |
| 8,266,185 B2 | 9/2012 | Raichelgauz et al. |
| 8,312,031 B2 | 11/2012 | Raichelgauz et al. |
| 8,316,005 B2 | 11/2012 | Moore |
| 8,326,775 B2 | 12/2012 | Raichelgauz et al. |
| 8,332,478 B2 | 12/2012 | Levy et al. |
| 8,655,801 B2 | 2/2014 | Raichelgauz et al. |
| 8,677,377 B2 | 3/2014 | Cheyer et al. |
| 8,682,667 B2 | 3/2014 | Haughay |
| 8,688,446 B2 | 4/2014 | Yanagihara |
| 8,706,503 B2 | 4/2014 | Cheyer et al. |
| 8,775,442 B2 | 7/2014 | Moore et al. |
| 8,868,619 B2 | 10/2014 | Raichelgauz et al. |
| 8,880,539 B2 | 11/2014 | Raichelgauz et al. |
| 8,880,566 B2 | 11/2014 | Raichelgauz et al. |
| 8,898,568 B2 | 11/2014 | Bull et al. |
| 8,922,414 B2 | 12/2014 | Raichelgauz et al. |
| 8,959,037 B2 | 2/2015 | Raichelgauz et al. |
| 8,990,125 B2 | 3/2015 | Raichelgauz et al. |
| 9,009,086 B2 | 4/2015 | Raichelgauz et al. |
| 9,031,999 B2 | 5/2015 | Raichelgauz et al. |
| 9,087,049 B2 | 7/2015 | Raichelgauz et al. |
| 9,104,747 B2 | 8/2015 | Raichelgauz et al. |
| 9,191,626 B2 | 11/2015 | Raichelgauz et al. |
| 9,197,244 B2 | 11/2015 | Raichelgauz et al. |
| 9,218,606 B2 | 12/2015 | Raichelgauz et al. |
| 9,235,557 B2 | 1/2016 | Raichelgauz et al. |
| 9,256,668 B2 | 2/2016 | Raichelgauz et al. |
| 9,330,189 B2 | 5/2016 | Raichelgauz et al. |
| 2001/0019633 A1 | 9/2001 | Tenze et al. |
| 2001/0056427 A1 | 12/2001 | Yoon et al. |
| 2002/0019881 A1 | 2/2002 | Bokhari et al. |
| 2002/0059580 A1 | 5/2002 | Kalker et al. |
| 2002/0087530 A1 | 7/2002 | Smith et al. |
| 2002/0107827 A1 | 8/2002 | Benitez-Jimenez et al. |
| 2002/0123928 A1 | 9/2002 | Eldering et al. |
| 2002/0126872 A1 | 9/2002 | Brunk et al. |
| 2002/0143976 A1 | 10/2002 | Barker et al. |
| 2002/0163532 A1 | 11/2002 | Thomas et al. |
| 2002/0178410 A1 | 11/2002 | Haitsma et al. |
| 2003/0028660 A1 | 2/2003 | Igawa et al. |
| 2003/0041047 A1 | 2/2003 | Chang et al. |
| 2003/0078766 A1 | 4/2003 | Appelt et al. |
| 2003/0086627 A1 | 5/2003 | Berriss et al. |
| 2003/0126147 A1 | 7/2003 | Essafi et al. |
| 2003/0182567 A1 | 9/2003 | Barton et al. |
| 2003/0191764 A1 | 10/2003 | Richards |
| 2003/0200217 A1 | 10/2003 | Ackerman |
| 2004/0003394 A1 | 1/2004 | Ramaswamy |
| 2004/0025180 A1 | 2/2004 | Begeja et al. |
| 2004/0068510 A1 | 4/2004 | Hayes et al. |
| 2004/0107181 A1 | 6/2004 | Rodden |
| 2004/0111465 A1 | 6/2004 | Chuang et al. |
| 2004/0117367 A1 | 6/2004 | Smith et al. |
| 2004/0128142 A1 | 7/2004 | Whitham |
| 2004/0128511 A1 | 7/2004 | Sun et al. |
| 2004/0133927 A1 | 7/2004 | Sternberg et al. |
| 2004/0153426 A1 | 8/2004 | Nugent |
| 2004/0215663 A1 | 10/2004 | Liu et al. |
| 2004/0249779 A1 | 12/2004 | Nauck et al. |
| 2004/0260688 A1 | 12/2004 | Gross |
| 2005/0144455 A1 | 6/2005 | Haitsma |
| 2005/0177372 A1 | 8/2005 | Wang et al. |
| 2006/0013451 A1 | 1/2006 | Haitsma |
| 2006/0020860 A1 | 1/2006 | Tardif et al. |
| 2006/0026203 A1 | 2/2006 | Tan et al. |
| 2006/0031216 A1 | 2/2006 | Semple et al. |
| 2006/0041596 A1 | 2/2006 | Stirbu et al. |
| 2006/0048191 A1 | 3/2006 | Xiong |
| 2006/0064037 A1 | 3/2006 | Shalon et al. |
| 2006/0143674 A1 | 6/2006 | Jones et al. |
| 2006/0153296 A1 | 7/2006 | Deng |
| 2006/0159442 A1 | 7/2006 | Kim et al. |
| 2006/0173688 A1 | 8/2006 | Whitham |
| 2006/0184638 A1 | 8/2006 | Chua et al. |
| 2006/0204035 A1 | 9/2006 | Guo et al. |
| 2006/0236343 A1 | 10/2006 | Chang |
| 2006/0242139 A1 | 10/2006 | Butterfield et al. |
| 2006/0242554 A1 | 10/2006 | Gerace et al. |
| 2006/0248558 A1 | 11/2006 | Barton et al. |
| 2006/0253423 A1 | 11/2006 | McLane et al. |
| 2007/0009159 A1 | 1/2007 | Fan |
| 2007/0011151 A1 | 1/2007 | Hagar et al. |
| 2007/0038608 A1 | 2/2007 | Chen |
| 2007/0042757 A1 | 2/2007 | Jung et al. |
| 2007/0067682 A1 | 3/2007 | Fang |
| 2007/0071330 A1 | 3/2007 | Oostveen et al. |
| 2007/0074147 A1 | 3/2007 | Wold |
| 2007/0130112 A1 | 6/2007 | Lin |
| 2007/0130159 A1 | 6/2007 | Gulli et al. |
| 2007/0168413 A1 | 7/2007 | Barletta et al. |
| 2007/0174320 A1 | 7/2007 | Chou |
| 2007/0195987 A1 | 8/2007 | Rhoads |
| 2007/0220573 A1 | 9/2007 | Chiussi et al. |
| 2007/0244902 A1 | 10/2007 | Seide et al. |
| 2007/0253594 A1 | 11/2007 | Lu et al. |
| 2007/0255785 A1 | 11/2007 | Hayashi et al. |
| 2007/0268309 A1 | 11/2007 | Tanigawa et al. |
| 2007/0282826 A1 | 12/2007 | Hoeber et al. |
| 2007/0294295 A1 | 12/2007 | Finkelstein et al. |
| 2008/0019614 A1 | 1/2008 | Robertson et al. |
| 2008/0040277 A1 | 2/2008 | DeWitt |
| 2008/0046406 A1 | 2/2008 | Seide et al. |
| 2008/0049629 A1 | 2/2008 | Morrill |
| 2008/0072256 A1 | 3/2008 | Boicey et al. |
| 2008/0091527 A1 | 4/2008 | Silverbrook et al. |
| 2008/0163288 A1 | 7/2008 | Ghosal et al. |
| 2008/0165861 A1* | 7/2008 | Wen .............. H04N 19/139 |
| | | 375/240.26 |
| 2008/0172615 A1 | 7/2008 | Igelman et al. |
| 2008/0201299 A1 | 8/2008 | Lehikoinen et al. |
| 2008/0201314 A1 | 8/2008 | Smith et al. |
| 2008/0204706 A1 | 8/2008 | Magne et al. |
| 2008/0253737 A1 | 10/2008 | Kimura et al. |
| 2008/0270373 A1 | 10/2008 | Oostveen et al. |
| 2008/0313140 A1 | 12/2008 | Pereira et al. |
| 2009/0013414 A1 | 1/2009 | Washington et al. |
| 2009/0037408 A1 | 2/2009 | Rodgers |
| 2009/0089587 A1 | 4/2009 | Brunk et al. |
| 2009/0119157 A1 | 5/2009 | Dulepet |
| 2009/0125529 A1 | 5/2009 | Vydiswaran et al. |
| 2009/0148045 A1 | 6/2009 | Lee et al. |
| 2009/0172030 A1 | 7/2009 | Schiff et al. |
| 2009/0175538 A1 | 7/2009 | Bronstein et al. |
| 2009/0204511 A1 | 8/2009 | Tsang |
| 2009/0216639 A1 | 8/2009 | Kapczynski et al. |
| 2009/0245573 A1 | 10/2009 | Saptharishi et al. |
| 2009/0245603 A1 | 10/2009 | Koruga et al. |
| 2009/0253583 A1 | 10/2009 | Yoganathan |
| 2009/0254824 A1 | 10/2009 | Singh |
| 2009/0277322 A1 | 11/2009 | Cai et al. |
| 2010/0023400 A1 | 1/2010 | DeWitt |
| 2010/0042646 A1 | 2/2010 | Raichelgauz et al. |
| 2010/0082684 A1 | 4/2010 | Churchill et al. |
| 2010/0088321 A1 | 4/2010 | Solomon et al. |
| 2010/0104184 A1 | 4/2010 | Bronstein et al. |
| 2010/0106857 A1 | 4/2010 | Wyler |
| 2010/0125569 A1 | 5/2010 | Nair et al. |
| 2010/0162405 A1* | 6/2010 | Cook .................. G06F 21/552 |
| | | 726/26 |
| 2010/0173269 A1 | 7/2010 | Puri et al. |
| 2010/0191567 A1 | 7/2010 | Lee et al. |
| 2010/0268524 A1 | 10/2010 | Nath et al. |
| 2010/0306193 A1 | 12/2010 | Pereira et al. |
| 2010/0318493 A1 | 12/2010 | Wessling |
| 2010/0322522 A1 | 12/2010 | Wang et al. |
| 2011/0035289 A1 | 2/2011 | King et al. |
| 2011/0052063 A1 | 3/2011 | McAuley et al. |
| 2011/0055585 A1* | 3/2011 | Lee .................. H04L 9/0844 |
| | | 713/183 |
| 2011/0106782 A1 | 5/2011 | Ke et al. |
| 2011/0125727 A1 | 5/2011 | Zou et al. |

(56) References Cited

U.S. PATENT DOCUMENTS

| | | |
|---|---|---|
| 2011/0145068 A1 | 6/2011 | King et al. |
| 2011/0202848 A1 | 8/2011 | Ismalon |
| 2011/0208822 A1 | 8/2011 | Rathod |
| 2011/0246566 A1 | 10/2011 | Kashef et al. |
| 2011/0251896 A1 | 10/2011 | Impollonia et al. |
| 2011/0313856 A1 | 12/2011 | Cohen et al. |
| 2012/0131454 A1 | 5/2012 | Shah |
| 2012/0150890 A1 | 6/2012 | Jeong et al. |
| 2012/0167133 A1 | 6/2012 | Carroll et al. |
| 2012/0191686 A1 | 7/2012 | Hjelm et al. |
| 2012/0197857 A1 | 8/2012 | Huang et al. |
| 2012/0330869 A1 | 12/2012 | Durham |
| 2013/0031489 A1 | 1/2013 | Gubin et al. |
| 2013/0067035 A1 | 3/2013 | Amanat et al. |
| 2013/0086499 A1 | 4/2013 | Dyor et al. |
| 2013/0104251 A1 | 4/2013 | Moore et al. |
| 2013/0173635 A1 | 7/2013 | Sanjeev |
| 2013/0325550 A1 | 12/2013 | Varghese et al. |
| 2013/0332951 A1 | 12/2013 | Gharaat et al. |
| 2014/0019264 A1 | 1/2014 | Wachman et al. |
| 2014/0147829 A1 | 5/2014 | Jerauld |
| 2015/0289022 A1 | 10/2015 | Gross |

OTHER PUBLICATIONS

Cococcioni, et al, "Automatic Diagnosis of Defects of Rolling Element Bearings Based on Computational Intelligence Techniques", University of Pisa, Pisa, Italy, 2009.

Emami, et al, "Role of Spatiotemporal Oriented Energy Features for Robust Visual Tracking in Video Surveillance, University of Queensland", St. Lucia, Australia, 2012.

Garcia, "Solving the Weighted Region Least Cost Path Problem Using Transputers", Naval Postgraduate School, Monterey, California, Dec. 1989.

Mahdhaoui, et al, "Emotional Speech Characterization Based on Multi-Features Fusion for Face-to-Face Interaction", Universite Pierre et Marie Curie, Paris, France, 2009.

Marti, et al, "Real Time Speaker Localization and Detection System for Camera Steering in Multiparticipant Videoconferencing Environments", Universidad Politecnica de Valencia, Spain, 2011.

Nagy et al, "A Transputer, Based, Flexible, Real-Time Control System for Robotic Manipulators", UKACC International Conference on Control '96, Sep. 2-5, 1996, Conference 1996, Conference Publication No. 427, IEE 1996.

Scheper, et al. "Nonlinear dynamics in neural computation", ESANN'2006 proceedings—European Symposium on Artificial Neural Networks, Bruges (Belgium), Apr. 26-28, 2006, d-side publi, ISBN 2-930307-06-4.

Theodoropoulos et al, "Simulating Asynchronous Architectures on Transputer Networks", Proceedings of the Fourth Euromicro Workshop on Parallel and Distributed Processing, 1996. PDP '96.

Guo et al, "AdOn: An Intelligent Overlay Video Advertising System", SIFIG, Boston, Massachusetts, Jul. 19-23, 2009.

Mei, et al., "Contextual In-Image Advertising", Microsoft Research Asia, pp. 439-448, 2008.

Mei, et al., "VideoSense—Towards Effective Online Video Advertising", Microsoft Research Asia, pp. 1075-1084, 2007.

Semizarov et al. "Specificity of Short Interfering RNA Determined through Gene Expression Signatures", PNAS, 2003, pp. 6347-6352.

Burgsteiner et al.: "Movement Prediction From Real-World Images Using a Liquid State Machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.

Cernansky et al., "Feed-forward Echo State Networks"; Proceedings of International Joint Conference on Neural Networks, Montreal, Canada, Jul. 31-Aug. 4, 2005.

Fathy et al., "A Parallel Design and Implementation for Backpropagation Neural Network Using NIMD Architecture", 8th Mediterranean Electrotechnical Corsfe rersce, 19'96. MELECON '96, Date of Conference: May 13-16, 1996, vol. 3, pp. 1472-1475.

Foote, Jonathan et al., "Content-Based Retrieval of Music and Audio"; 1997, Institute of Systems Science, National University of Singapore, Singapore (Abstract).

Freisleben et al., "Recognition of Fractal Images Using a Neural Network", Lecture Notes in Computer Science, 1993, vol. 6861, 1993, pp. 631-637.

Howlett et al., "A Multi-Computer Neural Network Architecture in a Virtual Sensor System Application", International Journal of Knowledge-based Intelligent Engineering Systems, 4 (2). pp. 86-93, 133N 1327-2314; first submitted Nov. 30, 1999; revised version submitted Mar. 10, 2000.

International Search Authority: "Written Opinion of the International Searching Authority" (PCT Rule 43bis.1) including International Search Report for International Patent Application No. PCT/US2008/073852; Date of Mailing: Jan. 28, 2009.

International Search Authority: International Preliminary Report on Patentability (Chapter I of the Patent Cooperation Treaty) including "Written Opinion of the International Searching Authority" (PCT Rule 43bis. 1) for the corresponding International Patent Application No. PCT/IL2006/001235; Date of Issuance: Jul. 28, 2009.

International Search Report for the corresponding International Patent Application PCT/IL2006/001235; Date of Mailing: Nov. 2, 2008.

IPO Examination Report under Section 18(3) for corresponding UK application No: GB1001219.3, dated May 30, 2012.

Iwamoto, K.; Kasutani, E.; Yamada, A.: "Image Signature Robust to Caption Superimposition for Video Sequence Identification"; 2006 IEEE International Conference on Image Processing; pp. 3185-3188, Oct. 8-11, 2006; doi: 10.1109/ICIP.2006.313046.

Jaeger, H.: "The "echo state" approach to analysing and training recurrent neural networks", GMD Report, No. 148, 2001, pp. 1-43, XP002466251. German National Research Center for Information Technology.

Lin, C.; Chang, S.: "Generating Robust Digital Signature for Image/Video Authentication", Multimedia and Security Workshop at ACM Mutlimedia '98; Bristol, U.K., Sep. 1998; pp. 49-54.

Lyon, Richard F.; "Computational Models of Neural Auditory Processing"; IEEE International Conference on Acoustics, Speech, and Signal Processing, ICASSP '84, Date of Conference: Mar. 1984, vol. 9, pp. 41-44.

Maass, W. et al.: "Computational Models for Generic Cortical Microcircuits", Institute for Theoretical Computer Science, Technische Universitaet Graz, Graz, Austria, published Jun. 10, 2003.

Morad, T.Y. et al.: "Performance, Power Efficiency and Scalability of Asymmetric Cluster Chip Multiprocessors", Computer Architecture Letters, vol. 4, Jul. 4, 2005 (Jul. 4, 2005), pp. 1-4, XP002466254.

Natsclager, T. et al.: "The "liquid computer": A novel strategy for real-time computing on time series", Special Issue on Foundations of Information Processing of Telematik, vol. 8, No. 1, 2002, pp. 39-43, XP002466253.

Ortiz-Boyer et al., "CIXL2: A Crossover Operator for Evolutionary Algorithms Based on Population Features", Journal of Artificial Intelligence Research 24 (2005) 1-48 Submitted Nov. 2004; published Jul. 2005.

Raichelgauz, I. et al.: "Co-evolutionary Learning in Liquid Architectures", Lecture Notes in Computer Science, [Online] vol. 3512, Jun. 21, 2005 (Jun. 21, 2005), pp. 241-248, XP019010280 Springer Berlin/Heidelberg ISSN: 1611-3349 ISBN: 978-3-540-26208-4.

Ribert et al. "An Incremental Hierarchical Clustering", Visicon Interface 1999, pp. 586-591.

Verstraeten et al., "Isolated word recognition with the Liquid State Machine: a case study"; Department of Electronics and Information Systems, Ghent University, Sint-Pietersnieuwstraat 41, 9000 Gent, Belgium, Available online Jul. 14, 2005.

Verstraeten et al.: "Isolated word recognition with the Liquid State Machine; a case study", Information Processing Letters, Amsterdam, NL, col. 95, No. 6, Sep. 30, 2005 (Sep. 30, 2005), pp. 521-528, XP005028093 ISSN: 0020-0190.

(56) References Cited

OTHER PUBLICATIONS

Ware et al., "Locating and Identifying Components in a Robot's Workspace using a Hybrid Computer Architecture"; Proceedings of the 1995 IEEE International Symposium on Intelligent Control, Aug. 27-29, 1995, pp. 139-144.
Xian-Sheng Hua et al.: "Robust Video Signature Based on Ordinal Measure" In: 2004 International Conference on Image Processing, ICIP '04; Microsoft Research Asia, Beijing, China; published Oct. 24-27, 2004, pp. 685-688.
Zeevi, Y. et al.: "Natural Signal Classification by Neural Cliques and Phase-Locked Attractors", IEEE World Congress on Computational Intelligence, IJCNN2006, Vancouver, Canada, Jul. 2006 (Jul. 2006), XP002466252.
Zhou et al., "Ensembling neural networks: Many could be better than all"; National Laboratory for Novel Software Technology, Nanjing Unviersirty, Hankou Road 22, Nanjing 210093, PR China; Received Nov. 16, 2001, Available online Mar. 12, 2002; Entire Document.
Zhou et al., "Medical Diagnosis With C4.5 Rule Preceded by Artificial Neural Network Ensemble"; IEEE Transactions on Information Technology in Biomedicine, vol. 7, Issue: 1, pp. 37-42, Date of Publication: Mar. 2003.
Clement, et al. "Speaker Diarization of Heterogeneous Web Video Files: A Preliminary Study", Acoustics, Speech and Signal Processing (ICASSP), 2011, IEEE International Conference on Year: 2011, pp. 4432-4435, DOI: 10.1109/ICASSP.2011.5947337 IEEE Conference Publications, France.
Gong, et al., "A Knowledge-based Mediator for Dynamic Integration of Heterogeneous Multimedia Information Sources", Video and Speech Processing, 2004, Proceedings of 2004 International Symposium on Year: 2004, pp. 167-470, DOI: 10.1109/ISIMP2004.1434102 IEEE Conference Publications, Hong Kong.
Lin, et al., "Robust Digital Signature for Multimedia Authentication: A Summary", IEEE Circuits and Systems Magazine, 4th Quarter 2003, pp. 23-26.
Lin, et al., "Summarization of Large Scale Social Network Activity", Acoustics, Speech and Signal Processing, 2009, ICASSP 2009, IEEE International Conference on Year 2009, pp. 3481-3484, DOI: 10.1109/ICASSP.2009.4960375, IEEE Conference Publications, Arizona.
Nouza, et al., "Large-scale Processing, Indexing and Search System for Czech Audio-Visual Heritage Archives", Multimedia Signal Processing (MMSP), 2012, pp. 337-342, IEEE 14th Intl. Workshop, DOI: 10.1109/MMSP.2012.6343465, Czech Republic.
Li, et al., "Matching Commercial Clips from TV Streams Using a Unique, Robust and Compact Signature," Proceedings of the Digital Imaging Computing: Techniques and Applications, Feb. 2005, vol. 0-7695-2467, Australia.
May et al., "The Transputer", Springer-Verlag, Berlin Heidelberg, 1989, teaches multiprocessing system.
Nam, et al., "Audio Visual Content-Based Violent Scene Characterization", Department of Electrical and Computer Engineering, Minneapolis, MN, 1998, pp. 353-357.
Vailaya, et al., "Content-Based Hierarchical Classification of Vacation Images," I.E.E.E: Multimedia Computing and Systems, vol. 1, 1999, East Lansing, MI, pp. 518-523.
Vallet, et al., "Personalized Content Retrieval in Context Using Ontological Knowledge," IEEE Transactions on Circuits and Systems for Video Technology, vol. 17, No. 3, Mar. 2007, pp. 336-346.
Whitby-Strevens, "The Transputer", 1985 IEEE, Bristol, UK.
Yanai, "Generic Image Classification Using Visual Knowledge on the Web," MM'03, Nov. 2-8, 2003, Tokyo, Japan, pp. 167-176.
Liu, et al., "Instant Mobile Video Search With Layered Audio-Video Indexing and Progressive Transmission", Multimedia, IEEE Transactions on Year: 2014, vol. 16, Issue: 8, pp. 2242-2255, DOI: 10.1109/TMM.20142359332 IEEE Journals & Magazines.
Mladenovic, et al., "Electronic Tour Guide for Android Mobile Platform with Multimedia Travel Book", Telecommunications Forum (TELFOR), 2012 20th Year: 2012, pp. 1460-1463, DOI: 10.1109/TELFOR.2012.6419494 IEEE Conference Publications.
Park, et al., "Compact Video Signatures for Near-Duplicate Detection on Mobile Devices", Consumer Electronics (ISCE 2014), The 18th IEEE International Symposium on Year: 2014, pp. 1-2, DOI: 10.1109/ISCE.2014.6884293 IEEE Conference Publications.
Wang et al. "A Signature for Content-based Image Retrieval Using a Geometrical Transform", ACM 1998, pp. 229-234.
Zang, et al., "A New Multimedia Message Customizing Framework for Mobile Devices", Multimedia and Expo, 2007 IEEE International Conference on Year: 2007, pp. 1043-1046, DOI: 10.1109/ICME.2007.4284832 IEEE Conference Publications.
Chuan-Yu Cho, et al., "Efficient Motion-Vector-Based Video Search Using Query by Clip", 2004, IEEE, Taiwan, pp. 1-4.
Gomes et al., "Audio Watermaking and Fingerprinting: For Which Applications?" University of Rene Descartes, Paris, France, 2003.
Ihab Al Kabary, et al., "SportSense: Using Motion Queries to Find Scenes in Sports Videos", Oct. 2013, ACM, Switzerland, pp. 1-3.
Jianping Fan et al., "Concept-Oriented Indexing of Video Databases: Towards Semantic Sensitive Retrieval and Browsing", IEEE, vol. 13, No. 7, Jul. 2004, pp. 1-19.
Shih-Fu Chang, et al., "VideoQ: A Fully Automated Video Retrieval System Using Motion Sketches", 1998, IEEE, New York, pp. 1-2.
Wei-Te Li et al., "Exploring Visual and Motion Saliency for Automatic Video Object Extraction", IEEE, vol. 22, No. 7, Jul. 2013, pp. 1-11.
Zhu et al., Technology-Assisted Dietary Assessment. Computational Imaging VI, edited by Charles A. Bouman, Eric L. Miller, Ilya Pollak, Proc. of SPIE-IS&T Electronic Imaging, SPIE vol. 6814, 681411, Copyright 2008 SPIE-IS&T. pp. 1-10.

* cited by examiner

SYSTEM AND METHOD FOR IDENTIFYING A TARGET AREA IN A MULTIMEDIA CONTENT ELEMENT

CROSS-REFERENCE TO RELATED APPLICATIONS

This application claims the benefit of U.S. Provisional Application No. 61/899,225 filed on Nov. 3, 2013. This application is a continuation-in-part (CIP) of U.S. patent application Ser. No. 13/770,603 filed on Feb. 19, 2013, now pending, which is a CIP of U.S. patent application Ser. No. 13/624,397 filed on Sep. 21, 2012, now pending. The Ser. No. 13/624,397 application is a CIP of:

(a) U.S. patent application Ser. No. 13/344,400 filed on Jan. 5, 2012, now pending, which is a continuation of U.S. patent application Ser. No. 12/434,221, filed May 1, 2009, now U.S. Pat. No. 8,112,376;

(b) U.S. patent application Ser. No. 12/195,863, filed Aug. 21, 2008, now U.S. Pat. No. 8,326,775, which claims priority under 35 USC 119 from Israeli Application No. 185414, filed on Aug. 21, 2007, and which is also a continuation-in-part of the below-referenced U.S. patent application Ser. No. 12/084,150; and (c) U.S. patent application Ser. No. 12/084,150 having a filing date of Apr. 7, 2009, now U.S. Pat. No. 8,655,801, which is the National Stage of International Application No. PCT/IL2006/001235 filed on Oct. 26, 2006, which claims foreign priority from Israeli Application No. 171577 filed on Oct. 26, 2005, and Israeli Application No. 173409 filed on 29 Jan. 2006.

All of the applications referenced above are herein incorporated by reference.

TECHNICAL FIELD

The present invention relates generally to the analysis of multimedia content captured by a user device, and more specifically to a system for identifying at least one target area of the multimedia content.

BACKGROUND

Wearable computing devices are clothing and accessories incorporating computer and advanced electronic technologies. Such wearable computer devices may be watches, bracelets, glasses, pendants, and so on that include one or more sensors in order to capture the signals related to the user activity.

Some wearable computing devices are further equipped with a network interface and a processing unit by which they are able to provide online content respective of the user activity, to the user. Wearable computing devices that are designed to collect signals related to user activity which the user carries in order to ease daily life are expected to become more and more common.

Due to the large amount and variety of signals, the problem with such wearable computing devices is that the task of identifying the exact content in which the user is interested in of the collected signals is quite complex, especially in cases where content related to the user activity changes fast due the dynamic and inconsistent daily activities of users.

It would therefore be advantageous to provide a solution that would overcome the deficiencies of the prior art by identifying the target area of user interest within the collected content.

SUMMARY

A summary of several example aspects of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all aspects nor delineate the scope of any or all aspects. Its sole purpose is to present some concepts of one or more embodiments in a simplified form as a prelude to the more detailed description that is presented later. For convenience, the term some embodiments may be used herein to refer to a single embodiment or multiple embodiments of the disclosure.

Certain embodiments disclosed herein include a system and a method for detecting a target area of user interest within a multimedia content element. The method comprises receiving the multimedia content element from a user computing device; partitioning the multimedia content element into a number of partitions, each partition having at least one object therein; generating at least one signature for each of the multimedia content elements, wherein each of the at least one signatures for each partition represents a concept; determining a context of the multimedia content element based on the concepts; and identifying at least one partition of the multimedia content as a target area of user interest based on the context of the multimedia content element.

The system comprises a processor communicatively connected to a network; a memory connected to the processing system, the memory containing instructions that when executed by the processing system, configure the system to: receive the multimedia content element from a user computing device; partition the multimedia content element into a number of partitions, each partition having at least one object therein; generate at least one signature for each of the multimedia content elements, wherein each of the at least one signatures for each partition represents a concept; determine a context of the multimedia content element based on the concepts; and identify at least one partition of the multimedia content as a target area of user interest based on the context of the multimedia content element.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

By way of example, the various disclosed embodiments include a system and method that determine a target area of user interest in a multimedia content element based on analysis of the multimedia content element. Accordingly, a multimedia content element is received from a user device. In a preferred embodiment, the user device is a wearable computing device. The multimedia content element is partitioned into a number of partitions wherein each partition includes at least one object. At least one signature is generated for each partition of the multimedia content element.

The signatures are analyzed to identify at least one partition of the multimedia content element as a target area of user interest. As will be discussed below the target area of user interest are determined based on the context of the multimedia content element.

Figure 1:
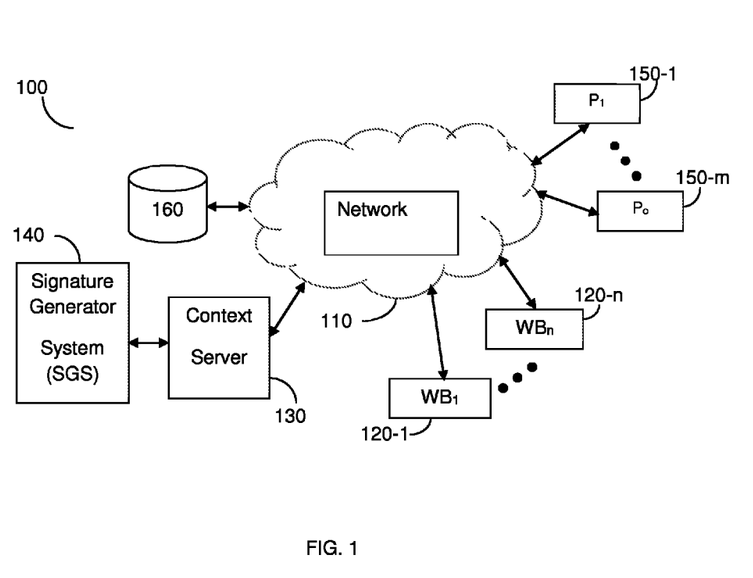
FIG. 1 is a schematic block diagram of a network system utilized to describe the various embodiments disclosed herein.

FIG. 1 shows an exemplary and non-limiting schematic diagram of a network system 100 utilized to describe the various embodiments disclosed herein. A network 110 is used to communicate between different parts of the system 100. The network 110 may be the Internet, the world-wide-web (WWW), a local area network (LAN), a wide area network (WAN), a metro area network (MAN), and other networks configured to communicate between the elements of the system 100.

Further connected to the network 110 are one or more computing devices 120-1 through 120-N (collectively referred to hereinafter as computing devices 120 or individually as a computing device 120) that are installed with client applications, such as web browsers (WB) 125-1 through 125-n (collectively referred to hereinafter as web browsers 125 or individually as a web browser 125). In a preferred embodiment, some of the computing devices 120 are wearable computing devices. It should be appreciated that the computing devices 120 also may also include a personal computer (PC), a personal digital assistant (PDA), a mobile phone, a smart phone, a tablet computer, and other kinds of wired and mobile appliances, equipped with browsing, viewing, listening, filtering, and managing capabilities etc., that are enabled as further discussed herein below.

The system 100 also includes a plurality of information sources 150-1 through 150-m (collectively referred to hereinafter as information sources 150 or individually as information sources 150) being connected to the network 110. Each of the information sources 150 may be, for example, a web server, an application server, a publisher server, an ad-serving system, a data repository, a database, and the like. Also connected to the network 110 is a data warehouse 160 that stores multimedia content elements, clusters of multimedia content elements, and the context determined for a web page as identified by its URL. In the embodiment illustrated in FIG. 1, a context server 130 communicates with the data warehouse 160 through the network 110. In other non-limiting configurations, the context sever 130 is directly connected to the data warehouse 160.

The various embodiments disclosed herein are realized using the context server 130 and a signature generator system (SGS) 140. The SGS 140 may be connected to the context server 130 directly or through the network 110. The context server 130 is configured to receive and serve multimedia content elements and to cause the SGS 140 to generate a signature respective of the multimedia content elements. The process for generating the signatures for multimedia content is explained in more details herein below with respect to FIGS. 3 and 4.

It should be noted that each of the server 130 and the SGS 140 typically comprises a processing system (not shown) that is coupled to a memory (not shown), and optionally a network interface (not shown). The processing system is connected to the memory, which typically contains instructions that can be executed by the processing system. The server 130 may also include a network interface (not shown) to the network 110. In one embodiment, the processing system is realized or includes an array of computational cores configured as discussed in more detail below. In another embodiment, the processing system of each of the server 130 and SGS 140 may comprise or be a component of a larger processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The context server 130 is configured to receive at least a URL of a web page hosted in an information source 150 and accessed by a web browser 125. The context server 130 is further configured to analyze the multimedia content elements contained in the web page to determine their context, thereby ascertaining the context of the web page. This is performed based on at least one signature generated for each multimedia content element. It should be noted that the context of an individual multimedia content element or a group of elements is extracted from the web page, received from a user of a web browser 125 (e.g., uploaded video clip), or retrieved from the data warehouse 160.

On a computing device 120, a user visits a web page using a web browser 125. In an embodiment, the multimedia content elements are provided from wearable computing devices 120 worn on the user. When the web page is uploaded on the user's web browser 125, a request is sent to the context server 130 to analyze the multimedia content elements contained in the web page. The request to analyze the multimedia content elements can be generated and sent by a script executed in the web page, an agent installed in the web browser, or by one of the information sources 150 (e.g., a web server or a publisher server) when requested to upload one or more advertisements to the web page. The request to analyze the multimedia content may include a URL of the web page or a copy of the web page. In one embodiment, the request may include multimedia content elements extracted from the web page. A multimedia content element may include, for example, an image, a graphic, a video stream, a video clip, an audio stream, an audio clip, a video frame, a photograph, and an image of signals (e.g., spectrograms, phasograms, scalograms, etc.), and/or combinations thereof and portions thereof.

The context server 130 is configured to analyze the multimedia content elements in the web page to determine their context. For example, if the web page contains images of palm trees, a beach, and the coast line of San Diego, the context of the web page may be determined to be "California sea shore." The determined context can be utilized to detect one or more matching advertisements for the multimedia content elements. To this end, the SGS 140 is configured to generate at least one signature for each multimedia content element provided by the context server 130. The generated signature(s) may be robust to noise and distortions as discussed below. Then, using the generated signature(s), the context server 130 is configured to determine the context of the elements and searches the data warehouse 160 for a matching advertisement based on the context. For example, if the signature of an image indicates a "California sea shore", then an advertisement for a swimsuit can be a potential matching advertisement.

A target area is considered a partition of a multimedia content element containing an object of interest to the user. According to the disclosed embodiments, the received multimedia content elements are partitioned by the context server 130 to a plurality of partitions. At least one of these partitions is identified as the target area of user interest based on the context of the multimedia content element. In one embodiment, metadata related to the user of the computing device 120 may be further be analyzed in order to identify the target area of user interest.

It should be noted that using signatures for determining the context and thereby for the searching of advertisements ensures more accurate reorganization of multimedia content than, for example, when using metadata. For instance, in order to provide a matching advertisement for a sports car it may be desirable to locate a car of a particular model. However, in most cases the model of the car would not be part of the metadata associated with the multimedia content (image). Moreover, the car shown in an image may be at angles different from the angles of a specific photograph of the car that is available as a search item. This is especially true of images captured from wearable computing devices 120. The signature generated for that image would enable accurate recognition of the model of the car because the signatures generated for the multimedia content elements, according to the disclosed embodiments, allow for recognition and classification of multimedia content elements, such as, content-tracking, video filtering, multimedia taxonomy generation, video fingerprinting, speech-to-text, audio classification, element recognition, video/image search and any other application requiring content-based signatures generation and matching for large content volumes such as web and other large-scale databases.

It should be noted that the signatures generated for more than one multimedia content element may be clustered. The clustered signatures are used to determine the context of the web page and to search for a matching advertisement. The one or more selected matching advertisements are retrieved from the data warehouse 160 and uploaded to the web page on the web browser 125.

Figure 2:
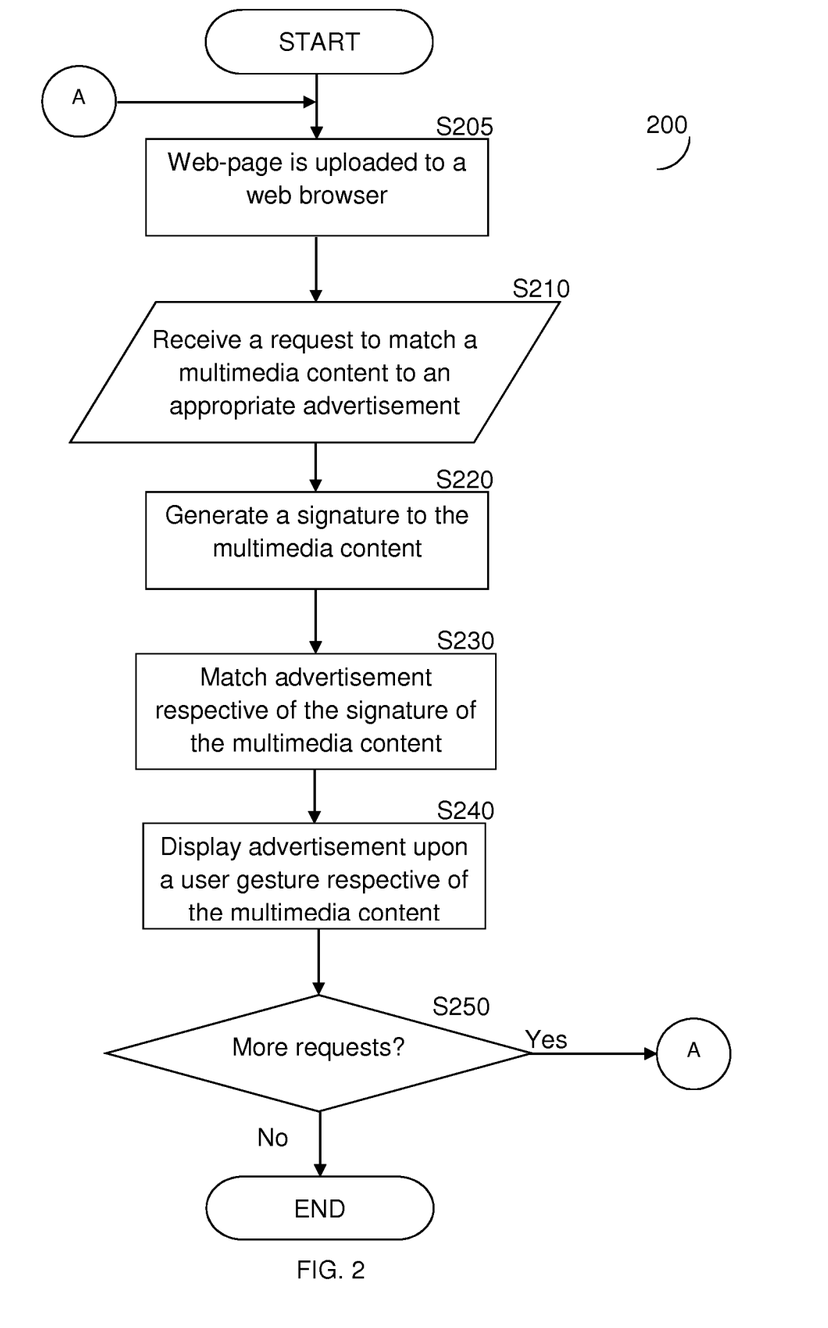
FIG. 2 is a flowchart describing the process of matching an advertisement to multimedia content displayed on a web page.

FIG. 2 depicts an exemplary and non-limiting flowchart 200 describing the process of matching an advertisement to multimedia content displayed on a web page. The execution of the method may be triggered when a web page is uploaded to one of the web browsers (e.g., web browser 125-1). In S210, a request to match at least one multimedia content element contained in the uploaded web page to an appropriate advertisement item is received. The request can be received from a publisher server, a script running on the uploaded web page, or an agent (e.g., an add-on) installed in the web browser. S210 can also include extracting the multimedia content elements for a signature that should be generated.

In S220, at least one signature for the multimedia content element extracted from the web page is generated. The signature for the multimedia content element generated by a signature generator is described below with respect to FIGS. 3 and 4. In one embodiment, based on the generated signatures, the context of the extracted multimedia content elements, and thereby the web page, is determined as described below with respect to FIG. 6.

In S230, an advertisement item is matched to the multimedia content element respective of its generated signatures and/or the determined context. The matching process includes searching for at least one advertisement item respective of the signature of the multimedia content and a display of the at least one advertisement item within the display area of the web page. The signatures generated for the multimedia content elements are clustered and the cluster of signatures is matched to one or more advertisement items. The matching of an advertisement to a multimedia content element can be performed by the computational cores that are part of a large scale matching discussed in detail below.

In S240, upon a user's gesture the advertisement item is uploaded to the web page and displayed therein. The user's gesture may be: a scroll on the multimedia content element, a press on the multimedia content element, and/or a response to the multimedia content. This ensures that the user's attention is given to the advertised content. In S250, it is checked whether there are additional requests to analyze multimedia content elements, and if so, execution continues with S210; otherwise, execution terminates.

As a non-limiting example, an image that contains a plurality of multimedia content elements is identified by the context server 130 in an uploaded web page. The SGS 140 generates at least one signature for each multimedia content element executed from the image that exists in the web page. According to this embodiment, a printer and a scanner are shown in the image and the SGS 140 generates signatures respective thereto. The server 130 is configured to determine that the context of the image is office equipment. Therefore, the context server 130 is configured to match at least one advertisement suitable for office equipment.

Figure 3:
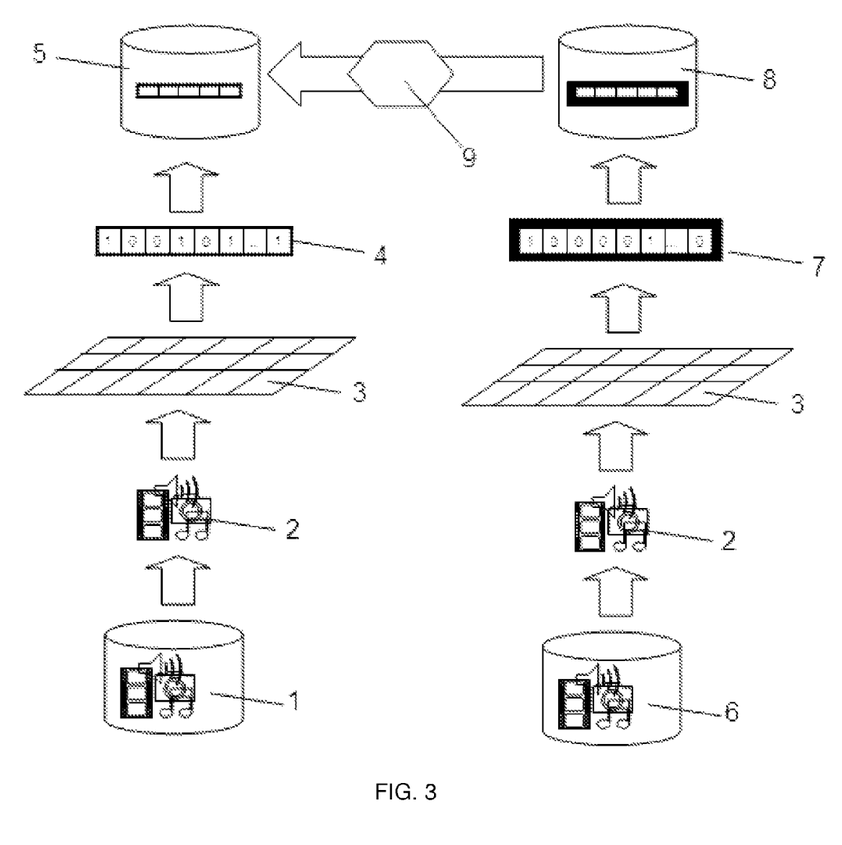
FIG. 3 is a block diagram depicting the basic flow of information in the signature generator system.
Figure 4:
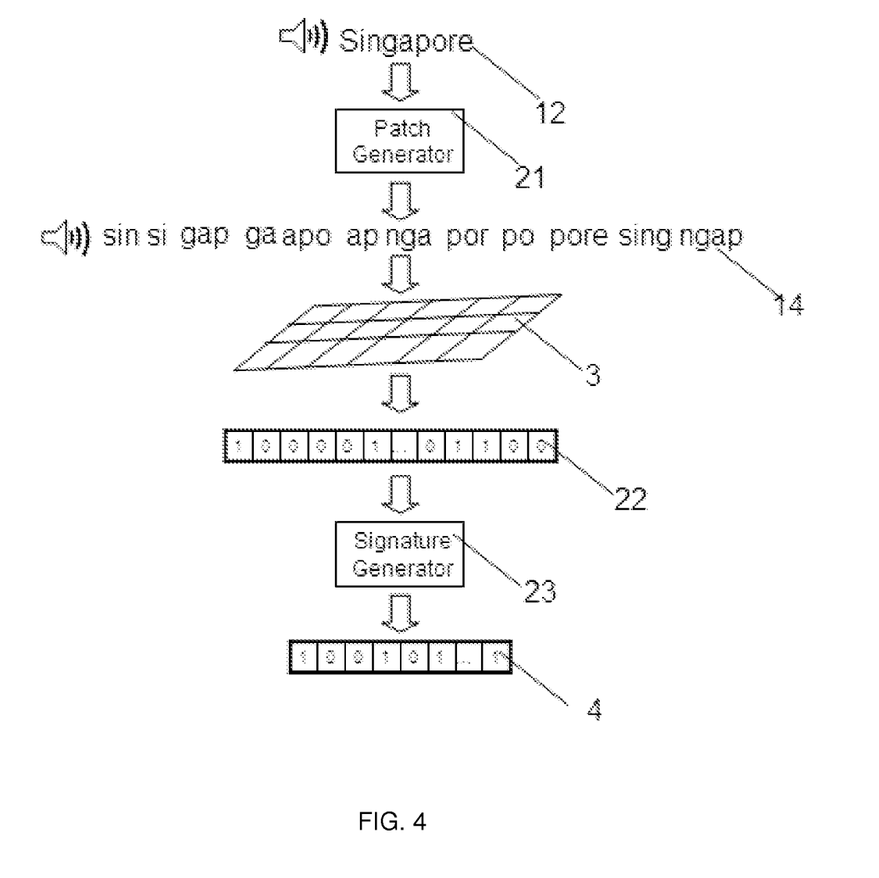
FIG. 4 is a diagram showing the flow of patches generation, response vector generation, and signature generation in a large-scale speech-to-text system.

FIGS. 3 and 4 illustrate the generation of signatures for the multimedia content elements by the SGS 140 according to one embodiment. An exemplary high-level description of the process for large scale matching is depicted in FIG. 3. In this example, the matching is for a video content.

Video content segments 2 from a Master database (DB) 6 and a Target DB 1 are processed in parallel by a large number of independent computational Cores 3 that constitute an architecture for generating the Signatures (hereinafter the "Architecture"). Further details on the computational Cores generation are provided below. The independent Cores 3 generate a database of Robust Signatures and Signatures 4 for Target content-segments 5 and a database of Robust Signatures and Signatures 7 for Master content-segments 8. An exemplary and non-limiting process of signature generation for an audio component is shown in detail in FIG. 4. Finally, Target Robust Signatures and/or Signatures are effectively matched, by a matching algorithm 9, to a Master Robust Signatures and/or Signatures database to find all matches between the two databases.

To demonstrate an example of the signature generation process, it is assumed, merely for the sake of simplicity and without limitation on the generality of the disclosed embodiments, that the signatures are based on a single frame, leading to certain simplification of the computational cores generation. The Matching System is extensible for signatures generation capturing the dynamics in between the frames.

The Signatures' generation process is now described with reference to FIG. 4. The first step in the process of signatures generation from a given speech-segment is to breakdown the speech-segment to K patches 14 of random length P and random position within the speech segment 12. The breakdown is performed by the patch generator component 21. The value of the number of patches K, random length P and random position parameters is determined based on optimization, considering the tradeoff between accuracy rate and the number of fast matches required in the flow process of the context server 130 and SGS 140. Thereafter, all the K patches are injected in parallel into all computational Cores 3 to generate K response vectors 22, which are fed into a signature generator system 23 to produce a database of Robust Signatures and Signatures 4.

In order to generate Robust Signatures, i.e., Signatures that are robust to additive noise L (where L is an integer equal to or greater than 1) by the Computational Cores 3 a frame 'i' is injected into all the Cores 3. Then, Cores 3 generate two binary response vectors: $\vec{S}$ which is a Signature vector, and $\vec{RS}$ which is a Robust Signature vector.

For generation of signatures robust to additive noise, such as White-Gaussian-Noise, scratch, etc., but not robust to distortions, such as crop, shift and rotation, etc., a core $Ci=\{ni\}$ ($1 \le i \le L$) may consist of a single leaky integrate-to-threshold unit (LTU) node or more nodes. The node ni equations are:

$$V_i = \sum_j w_{ij} k_j$$

$$n_i = \Pi(V_i - Th_x)$$

where $\pi$ is a Heaviside step function; $w_{ij}$ is a coupling node unit (CNU) between node i and image component j (for example, grayscale value of a certain pixel j); kj is an image component 'j' (for example, grayscale value of a certain pixel j); $Th_x$ is a constant Threshold value, where 'x' is 'S' for Signature and 'RS' for Robust Signature; and Vi is a Coupling Node Value.

The Threshold values $Th_x$ are set differently for Signature generation and for Robust Signature generation. For example, for a certain distribution of Vi values (for the set of nodes), the thresholds for Signature ($TH_S$) and Robust Signature ($TH_{RS}$) are set apart, after optimization, according to at least one or more of the following criteria:

1: For:

$$V_i > Th_{RS}$$

$$1-p(V>Th_s)-1-(1-\epsilon)^l \ll 1$$

i.e., given that l nodes (cores) constitute a Robust Signature of a certain image I, the probability that not all of these I nodes will belong to the Signature of same, but noisy image, Ĩ is sufficiently low (according to a system's specified accuracy).

2: $p(V_i > Th_{RS}) \approx l/L$ i.e., approximately l out of the total L nodes can be found to generate a Robust Signature according to the above definition.

3: Both Robust Signature and Signature are generated for certain frame i.

It should be understood that the generation of a signature is unidirectional, and typically yields lossless compression, where the characteristics of the compressed data are maintained but the uncompressed data cannot be reconstructed. Therefore, a signature can be used for the purpose of comparison to another signature without the need of comparison to the original data. The detailed description of the Signature generation can be found in U.S. Pat. Nos. 8,326,775 and 8,312,031, assigned to common assignee, which are hereby incorporated by reference for all the useful information they contain.

A computational core generation is a process of definition, selection, and tuning of the parameters of the cores for a certain realization in a specific system and application. The process is based on several design considerations, such as:

(a) The cores should be designed so as to obtain maximal independence, i.e., the projection from a signal space should generate a maximal pair-wise distance between any two cores' projections into a high-dimensional space.

(b) The cores should be optimally designed for the type of signals, i.e., the cores should be maximally sensitive to the spatio-temporal structure of the injected signal, for example, and in particular, sensitive to local correlations in time and space. Thus, in some cases a core represents a dynamic system, such as in state space, phase space, edge of chaos, etc., which is uniquely used herein to exploit their maximal computational power.

(c) The cores should be optimally designed with regard to invariance to a set of signal distortions, of interest in relevant applications.

A detailed description of the computational core generation and the process for configuring such cores is discussed in more detail in U.S. Pat. No. 8,655,801 referenced above.

Figure 5:
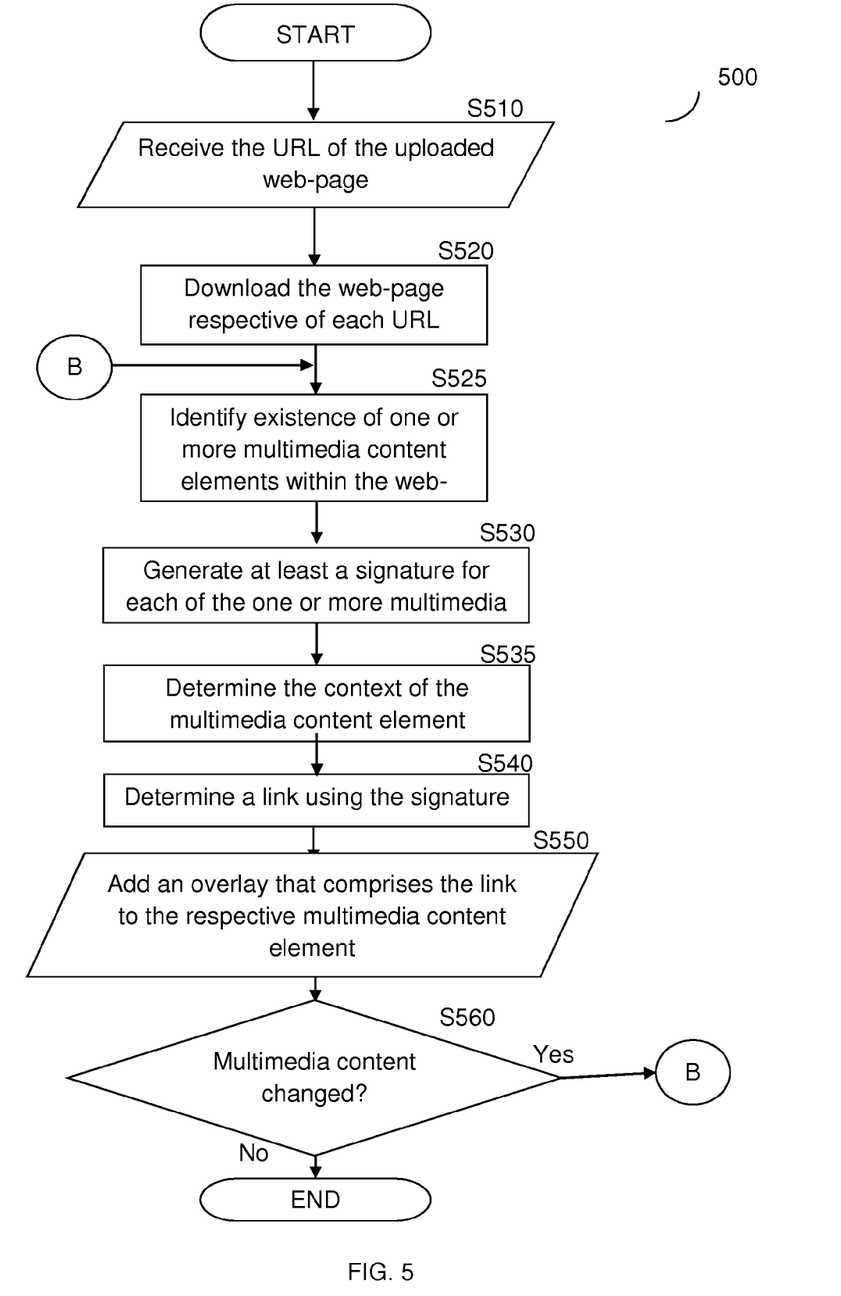
FIG. 5 is a flowchart describing the process of adding an overlay to multimedia content displayed on a web page.

FIG. 5 depicts an exemplary and non-limiting flowchart 500 describing the process of adding an overlay to multimedia content displayed on a web page. The execution of the method is triggered when a web page is uploaded to a web browser (e.g., web browser 125-1). In another embodiment, the method can start when a web server (e.g., web server 150-1) receives a request to host the requested web page.

In S510, the uniform resource locator (URL) of the uploaded web page is received. In another embodiment, the uploaded web page includes an embedded script. The script extracts the URL of the web page, and sends the URL to, for example, the context server 130. In another embodiment, an add-on installed in the web browser 125 extracts the URL of the uploaded web page, and sends the URL to the context server 130. In yet another embodiment, an agent is installed on a user device executing the web browser 125. The agent is configured to monitor web pages uploaded to the website, extract the URLs, and send them to the context server 130. In another embodiment, a web server (e.g., server 150), hosting the requested web page, provides the context server 130 with the URL of the requested web page. It should be noted that only URLs of selected web sites can be sent to the context server 130, for example, URLs related to web sites that paid for the additional information.

In S520, the web page respective of each received URL is downloaded, for example, to the context server 130. In S525, the web page is analyzed in order to identify the existence of at least one or more multimedia content elements in the uploaded web page. It should be understood that a multimedia content element, such as an image or a video, may include a plurality of multimedia content elements. In S530, for each identified multimedia content element at least one signature is generated. In one implementation, the signatures for the multimedia content elements are generated, by the SGS 140, as described in greater detail above.

In S535, respective of the generated signatures, the context of the multimedia content element is determined. The determination of context based on the signatures is discussed in more detail below. In S540, respective of the context or the signature of the elements, one or more links to content that exist on a web server, for example, an information source 150, that can be associated with the multimedia content element is determined. A link may be a hyperlink, a URL, and the like to external resource information.

That is, the content accessed through the link may be, for example, informative web-pages such as the Wikipedia® website. The determination of the link may be made by identification of the context and/or the generated signatures. As an example, if the context of the multimedia content elements was identified as a football player, then a link to a sports website that contains information about the football player is determined.

In S550, the determined link to the content is added as an overlay to the web page, respective of the corresponding multimedia content element. According to one embodiment, a link that contains the overlay may be provided to a web browser 125 (e.g., browser 125-1) respective of a user's gesture. A user's gesture may be: a scroll on the multimedia content element, a click on the at least one multimedia content element, and/or a response to the at least one multimedia content or portion thereof.

The modified web page that includes at least one multimedia content element with the added link can be sent directly to the web browser 125-1 requesting the web page. This requires establishing a data session between the context server 130 and the web browsers 125. In another embodiment, the multimedia element including the added link is returned to a web server (e.g., source 150) hosting the requested web page. The web server returns the requested web page with the multimedia element containing the added link to the web browser 125-1 requesting the web page. Once the "modified" web page is displayed over the web browser 125-1, a detected user's gesture over the multimedia element would cause the web browser 125-1 to upload the content (e.g., a Wikipedia web-page) accessed by the link added to the multimedia element.

In S560, it is checked whether the one or more multimedia content elements contained in the web page has changed, and if so, execution continues with S525; otherwise, execution terminates.

As a non-limiting example, a web page containing an image of the movie "Pretty Woman" is uploaded to the context server 130. A signature is generated by the SGS 140 respective of the actor Richard Gere and the actress Julia Roberts, both shown in the image. The context of the signatures according to this example may be "American Movie Actors." An overlay containing the links to Richard Gere's biography and Julia Roberts' biography on the Wikipedia® website is added over the image such that upon detection of a user's gesture, for example, a mouse clicking over the part of the image where Richard Gere is shown, the link to Richard Gere's biography on Wikipedia® is provided to the user.

According to another embodiment, a web page that contains an embedded video clip is requested by a web browser 125-1 from an information source 150-1 and a banner advertising New York City. The context server 130 receives the requested URL. The context server 130 analyzes the video content and the banner within the requested web page and a signature is generated by the SGS 140 respective of the entertainer Madonna that is shown in the video content and the banner. The context of multimedia content embedded in the web page is determined to be "live pop shows in NYC." In response to the determined context, a link to a hosted website for purchasing show tickets is added as an overlay to the video clip. The web page together with the added link is sent to a web server (e.g., an information source 150-1), which then uploads the requested web page with the modified video element to the web browser 125-1.

The web page may contain a number of multimedia content elements; however, in some instances only a few links may be displayed in the web page. Accordingly, in one embodiment, the signatures generated for the multimedia content elements are clustered and the cluster of signatures is matched to one or more advertisement items.

Figure 6:
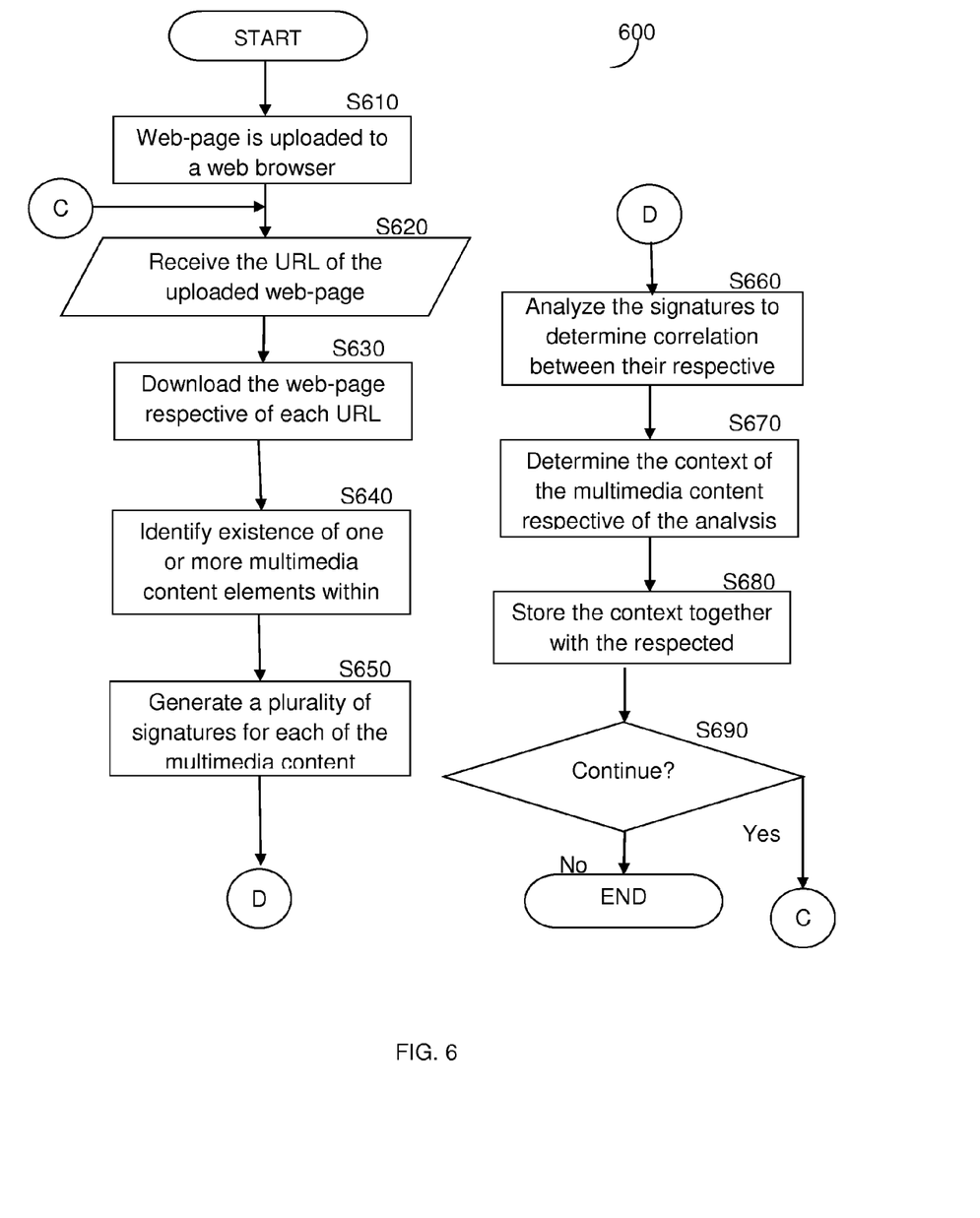
FIG. 6 is a flowchart describing a method for determining the context indicated by the relation between multimedia content elements displayed in a web.

FIG. 6 describes the operation of determining a context of a multimedia content element. The operation of the method may start when a web page is uploaded to a web browser 125 (e.g., web browser 125-1). Alternatively, the operation of the method is triggered when a web server (e.g., web browser 150-1) receives a request to host the requested web page.

In S620, the uniform resource locator (URL) of the web page to be processed is received. In another embodiment, the uploaded web page includes an embedded script. The script extracts the URL of the web page, and sends the URL to, for example, the context server 130. In another embodiment, an add-on installed in the web browser 125 extracts the URL of the uploaded web page, and sends the URL to, for example, the context server 130. In yet another embodiment, an agent is installed on a user device executing the web browser 125. The agent is configured to monitor web pages uploaded to the website, extract the URLs, and send them to the, for example, context server 130. In another embodiment, the web server (e.g., an information source 150-1) hosting the requested web page, provides the context server 130 with the URL of the requested web page. It should be noted that only URLs of selected websites can be sent to the context server 130, for example, URLs related to web sites that paid for the additional information.

In S630, the web page respective of each received URL is downloaded, for example, to the server 130. In S640, the web page is analyzed in order to identify the existence of one or more multimedia content elements in the uploaded web page. Each identified multimedia content element is extracted from the web page and sent to the SGS 140.

In S650, for each identified multimedia content element at least one signature is generated. The at least one signature is robust for noise and distortion. The signatures for the multimedia content elements are generated as described in greater detail above. It should also be noted that signatures can be generated for portions of a multimedia content element. It should be noted the steps S620 through S650 may be performed as part of the method discussed with reference to FIG. 5 and may be repeated for the purpose of the determining the context. Thus, the operation of the determining a context of a multimedia element can start at S660.

In S660, the correlation between the signatures of all extracted multimedia content elements, or portions thereof is analyzed. Specifically, each signature represents a different concept. The signatures are analyzed to determine the correlation concepts. A concept is an abstract description of the content to which the signature was generated. For example, a concept of the signature generated for an image showing a bouquet of red roses is "flowers". The correlation between concepts can be achieved by identifying a ratio between signatures' sizes, a spatial location of each signature, and so on using probabilistic models. As noted above a signature represents a concept and is generated for a multimedia content element. Thus, identifying, for example, the ratio of signatures' sizes may also indicate the ratio between the size of their respective multimedia elements.

A context is determined as the correlation between a plurality of concepts. A strong context is determined when there are more concepts, or the plurality of concepts, satisfy the same predefined condition. As an example, signatures generated for multimedia content elements of a smiling child with a Ferris wheel in the background are analyzed. The concept of the signature of the smiling child is "amusement" and the concept of a signature of the Ferris wheel is "amusement park". The relation between the signatures of the child and recognized wheel are further analyzed, to determine that the Ferris wheel is bigger than the child. The relation analysis determines that the Ferris wheel is used to entertain the child. Therefore, the determined context may be "amusement."

According to one embodiment, the one or more typically probabilistic models can be utilized to determine the correlation between signatures representing concepts. The probabilistic models determine, for example, the probability that a signature may appear in the same orientation and in the same ratio as another signature. When performing the analysis, information maintained in the data warehouse 160 is utilized, for example, signatures previously analyzed. In S670, based on the analysis performed in S660, the context of a plurality of multimedia content elements that exist in the web page and in the context of the web page is determined.

The methods discussed with reference to FIGS. 5 and 6 can be performed by the context server 130. The signature generation is performed by the SGS 140. In an embodiment, the methods can be performed by a computing device 120.

As an example, an image that contains a plurality of multimedia content elements is identified by the context server 130 in an uploaded web page. The at least one signature for each of the plurality of multimedia content elements that exist in the image is generated. According to this example, the multimedia contents of the singer "Adele", "red carpet" and a "Grammy award" are shown in the image. The SGS 140 generates signatures respective thereto. The analysis of the correlation between "Adele", "red carpet" and a "Grammy award" results in an identified context of "Adele Wining the Grammy Award".

Following is another non-limiting example demonstrating the operation of the server 130. In this example, a web page containing a plurality of multimedia content elements is identified by the context server 130 in an uploaded web page. According to this example, the SGS 140 generates signatures for the objects such as, a "glass", a "cutlery" and a "plate" which appear in the multimedia elements. The context server 130 then analyzes the correlation between the concepts generated by signatures respective of the data maintained in the data warehouse 160, for example, analysis of previously generated signatures. According to this example, as the all concepts of the "glass", the "cutlery", and the "plate" satisfy the same predefined condition, a strong context is determined. The context of such concepts may be a "table set". The context can be also determined respective of a ratio of the sizes of the objects (glass, cutlery, and plate) in the image and the distinction of their spatial orientation.

In S680, the context of the multimedia content together with the respective signatures is stored in the data warehouse 160 for future use. In S690, it is checked whether there are additional web pages and if so execution continues with S620; otherwise, execution terminates.

Figure 7:
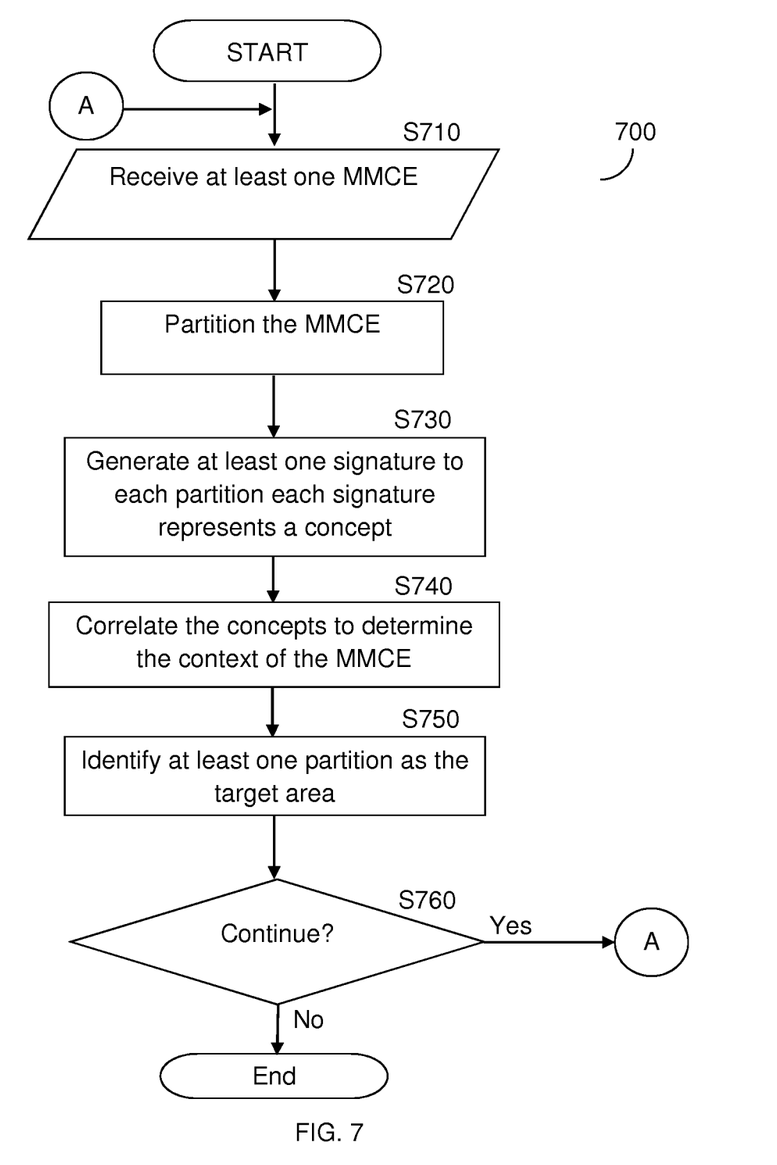
FIG. 7 is a flowchart describing a method for identifying a target area of interest in a multimedia content element according to one embodiment.

FIG. 7 depicts an exemplary and non-limiting flowchart 700 describing a method for identifying a target area of user interest in a multimedia content element according to one embodiment. A target area is considered a partition of a multimedia content element containing an object of interest to the user. In S710, the method starts when at least one multimedia content element is received. The multimedia content element can be captured by the user computing device 120, or displayed on the user computing device 120. For example, the multimedia content element can be an image captured by a camera on a user's wearable computing device 120. The multimedia content elements are identified after analysis of web pages, as described in greater detail in FIG. 5.

In S720, the received multimedia content element is partitioned by the context server 130 to a plurality of partitions. Each partition includes at least one object. Such an object can be displayed or played on the user computing device 120. For example, an object may be a portion of a video clip which can be captured or displayed on a smart watch, bracelet, or other wearable computer device 120. In S730, at least one signature is generated for each partition of the multimedia content element wherein. As noted above each generated signature represents a concept. The signature generation is further described hereinabove with respect of FIGS. 3 and 4. In an embodiment, a concept that matches the signature can be retrieved from the data warehouse 160. Techniques for retrieving concepts matching to signatures are further discussed in U.S. Pat. No. 8,266,185, assigned to common assignee and hereby incorporated by reference.

In S740, the context of the multimedia content element is determined. As noted above, this can be performed by correlating the concepts. After determining the context, in S750 at least one partition of the multimedia content is identified as the target area of user interest. In one embodiment, the signature generated for each partition is compared against the determined context. The partition of the signature that best matches the context is determined as the best match. Alternatively or collectively, metadata related to the user of the computing device 120 may further be analyzed in order to identify the target area of user interest. Such metadata may include, for example, personal variables related to the user, such as: demographic information, the user's profile, experience, a combination thereof, and so on. In one embodiment, at least one personal variable related to a user is received and a correlation above a predetermined threshold between the at least one personal variable and the at least one signature is found. It should be noted that a target area of user interest may also refer to a target object, a plurality of target objects as well as a plurality of target areas.

In S760, it is checked whether a new multimedia content element has been received; and if so execution continues with S720; otherwise, execution terminates. It should be noted that a new multimedia content element may refer to a multimedia element previously viewed, but now a different portion of such element is being viewed by the user device.

As a non-limiting example, an image of several basketball players is captured by a camera of a wearable computing device 120. The captured image is then sent to the context server 130 and is partitioned to a number of partitions, where in each partition one player is shown and a signature to each partition is generated respective thereto. Each signature represents a concept and by correlating the concepts; the context of the image is determined as the Los Angeles Lakers® basketball team. The user's experience indicates that the user searched several times for the Los Angeles Lakers® basketball player Kobe Bryant. Respective thereto, the area in which Kobe Bryant is shown is identified as the target area of user interest.

It should be noted that the identification of the target area of user interest enables publishers to show advertisements on the display of the user computing device 120 respective of the target object and/or area. For example, if a Toyota® Corola model vehicle is identified in the target area of user interest, advertisements for car agencies may be determined and shown on the web browser 125.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for detecting a target area of user interest within a multimedia content element of a web page, comprising:
    receiving, over a network, an indication of the multimedia content element from a user computing device communicatively coupled to the network;
    partitioning the multimedia content element into a number of partitions, each partition having at least one object therein;
    generating at least one signature for each partition of the multimedia content element, wherein each of the at least one signature for each partition represents a concept corresponding to one of the at least one object within the multimedia content element partition;
    determining a context of the multimedia content element based on the concepts; and
    identifying at least one partition of the multimedia content as a target area of user interest based on the context of the multimedia content element.

2. The method of claim 1, wherein identifying at least one target area of user interest comprises:
    receiving at least one personal variable related to a user; and
    finding a correlation above a predetermined threshold between the at least one personal variable and the at least one signature.

3. The method of claim 2, wherein the personal variable is at least one of: a user profile, demographic information related to the user of the user device, a user experience, and a combination thereof.

4. The method of claim 1, wherein the concept is an abstract description of a multimedia content element for which the signature is generated.

5. The method of claim 1, further comprising:
    storing in a data warehouse the at least one determined context.

6. The method of claim 1, wherein determining the context of the multimedia content element further comprises:
    correlating the concepts using at least one probabilistic model.

7. The method of claim 1, wherein the at least one signature is robust to noise and distortions.

8. The method of claim 1, wherein the computing device is a wearable computing device.

9. The method of claim 1, wherein the multimedia content element is at least one of: an image, graphics, a video stream, a video clip, an audio stream, an audio clip, a video frame, a photograph, images of signals, and portions thereof.

10. A non-transitory computer readable medium having stored thereon instructions for causing one or more processing units to execute the method according to claim 1.

11. A system for detecting a target area of user interest within at least one multimedia content element of a web page, comprising:
    a processor communicatively connected to a network;
    a memory connected to the processing system, the memory containing instructions that, when executed by the processing system, configure the system to:
    receive, over the network, an indication of the at least one multimedia content element from a user computing device communicatively coupled to the network;
    partition the multimedia content element into a number of partitions, each partition having at least one object therein;
    generate at least one signature for each partition of the multimedia content elements, wherein each of the at least one signatures for each partition represents a concept corresponding to one of the at least one object within the multimedia content element partition;
    determine a context of the multimedia content element based on the concepts; and
    identify at least one partition of the multimedia content as a target area of user interest based on the context of the multimedia content element.

12. The system of claim 11, wherein the system is further configured to:
    receive at least one personal variable related to a user; and
    find a correlation above a predetermined threshold between the at least one personal variable and the at least one signature.

13. The system of claim 12, wherein the personal variable is at least one of: a user profile, demographic information related to the user of the user device, a user experience, a combination thereof.

14. The system of claim 11, wherein the concept is an abstract description of a multimedia content element for which the signature is generated.

15. The system of claim 11, further comprising:
    a data warehouse for storing the at least one determined context.

16. The system of claim 11, wherein the system is further configured to
    correlate the concepts using at least one probabilistic model.

17. The system of claim 11, wherein the at least one signature is robust to noise and distortions.

18. The system of claim 11, wherein the computing device is a wearable computing device.

19. The system of claim 11, wherein each of the multimedia content element is at least one of: an image, graphics, a video stream, a video clip, an audio stream, an audio clip, a video frame, a photograph, images of signals, and portions thereof.

20. The system of claim 11, wherein the signature generator system (SGS) further comprises a plurality of computational cores enabled to receive the at least one multimedia content element, each computational core of the plurality of computational cores having properties that are at least partly statistically independent of other of the computational cores, i.e., the properties are set independently of each other core.

* * * * *